(12) United States Patent
Johnson et al.

(10) Patent No.: US 7,640,586 B1
(45) Date of Patent: Dec. 29, 2009

(54) REDUCING HTTP MALWARE SCANNER LATENCY USING HTTP RANGE QUERIES FOR RANDOM ACCESS

(75) Inventors: Tommy Olaus Johnson, Falls Church, VA (US); Eric David O'Brien, Leesburg, VA (US); Douglas Stone Kilpatrick, Sterling, VA (US)

(73) Assignee: McAfee, Inc., Santa Clara, CA (US)

(*) Notice: Subject to any disclaimer, the term of this patent is extended or adjusted under 35 U.S.C. 154(b) by 930 days.

(21) Appl. No.: 10/612,996

(22) Filed: Jul. 7, 2003

(51) Int. Cl.
G06F 11/00 (2006.01)
G06F 12/14 (2006.01)
G06F 12/16 (2006.01)
G08B 23/00 (2006.01)

(52) U.S. Cl. .................. 726/24; 713/152; 713/165; 713/188

(58) Field of Classification Search .............. 726/24
See application file for complete search history.

(56) References Cited

U.S. PATENT DOCUMENTS

| | | | |
|---|---|---|---|
| 6,088,803 A * | 7/2000 | Tso et al. | 726/22 |
| 6,266,681 B1 * | 7/2001 | Guthrie | 715/501.1 |
| 6,728,886 B1 * | 4/2004 | Ji et al. | 726/24 |
| 6,804,778 B1 * | 10/2004 | Levi et al. | 713/176 |
| 6,990,660 B2 * | 1/2006 | Moshir et al. | 717/171 |
| 7,023,861 B2 * | 4/2006 | Makinson et al. | 370/401 |
| 7,152,164 B1 * | 12/2006 | Loukas | 713/188 |
| 2002/0178381 A1 * | 11/2002 | Lee et al. | 713/201 |

OTHER PUBLICATIONS

Fielding et al., "Hypertext Transfer Protocol—HTTP/1.1", Network Working Froup, RFC 2616, Jun. 1999, pp. 1-108.*

* cited by examiner

*Primary Examiner*—Nasser G Moazzami
*Assistant Examiner*—Shewaye Gelagay
(74) *Attorney, Agent, or Firm*—Zilka-Kotab, PC

(57) ABSTRACT

A system, method, and computer program product for scanning downloaded files providing improved performance relative to conventional download scanning techniques by performing the download and scanning functions in parallel and random order, thus improving overall performance. A method of scanning a requested file for a computer malware comprising the steps of: receiving a request from a user system to transfer a file from a server. Starting to transfer said file, and at the same time, handing a partial copy of the file to computer malware scanning software, receiving requests from the computer malware scanning software for data comprising additional arbitrary portions of the requested file, transferring only the requested portion of the file and supplying the requested data to the computer malware scanning software until the malware scanning software can produce a clean/infected indication. Then completing the transfer of the entire file from the server and handing it off to the user system in parallel.

54 Claims, 5 Drawing Sheets

REDUCING HTTP MALWARE SCANNER LATENCY USING HTTP RANGE QUERIES FOR RANDOM ACCESS

FIELD OF THE INVENTION

The present invention relates to a system, method, and computer program product for scanning downloaded files that performs the download and malware scanning functions in parallel.

BACKGROUND OF THE INVENTION

As the popularity of the Internet has grown, the proliferation of computer malware has become more common. A typical computer malware is a program or piece of code that is loaded onto a computer and/or performs some undesired actions on a computer without the knowledge or consent of the computer operator. Some widespread, well-known and dangerous types of computer malware include computer viruses, which are programs or pieces of code that are loaded onto a computer without the user's knowledge and may proliferate further and/or damage the computer or other computers, and computer worms, which are programs or pieces of code that replicates themselves over a computer network and usually perform malicious actions.

Along with the proliferation of computer viruses and other malware has come a proliferation of software to detect and remove such viruses and other malware. This software is generically known as anti-virus software or programs. In order to detect a virus or other malicious program, an anti-virus program typically scans files stored on disk in a computer system and/or data that is being transferred or downloaded to a computer system, or that is being accessed on a computer system, and compares the data being scanned with profiles that identify various kinds of malware. The anti-virus program may then take corrective action, such as notifying a user or administrator of the computer system of the virus, isolating the file or data, deleting the file or data, etc.

One common source of computer viruses is files that are downloaded from the Internet. Such files are most advantageously scanned when they are downloaded. In order to standardize malware scanning in a network environment, the scanning functionality may be implemented on a server that is connected between the computer that is requesting the download and the Internet. There are two problems that arise in such an environment. First, the server platform that is performing the scanning has a limited network throughput. Second, the scanning engine has inherently limited performance scanning files.

One of the deficiencies of download scanning is that the scanning server must first download a file to be scanned in its entirety, before scanning, scan the file, and then transfer the file in its entirety to the user's machine. This has two drawbacks: 1) the latency incurred by first downloading the file to the scanning server, followed by the scan, followed by the second transfer; 2) the user perception that "nothing is happening" until the second transfer begins.

A need arises for a technique for scanning downloaded files that provides improved performance relative to conventional download scanning techniques.

SUMMARY OF THE INVENTION

The present invention is a system, method, and computer program product for scanning downloaded files that provides improved performance relative to conventional download scanning techniques. The present invention performs the download and scanning functions in parallel, thus improving overall performance.

In one embodiment of the present invention, a method of scanning a requested file for a computer malware comprises the steps of: receiving a request to transfer a file from computer malware scanning software, receiving a request from the computer malware scanning software for data comprising a portion of the requested file, and transferring the requested portion of the file and supplying the requested data to the computer malware scanning software fulfill the request for data comprising a portion of the requested file.

In one aspect of the present invention, the request to transfer the file from the computer malware scanning software comprises a request to transfer the file from an external system. The external system may be communicatively connected via a network. The network may comprise the Internet.

In one aspect of the present invention, the step of transferring the requested portion of the file comprises the steps of initiating a session with the external system to obtain the requested portion of the file. The session may be a hypertext transfer protocol session. The hypertext transfer protocol session may use a byte range technique.

In one aspect of the present invention, the method further comprises the steps of determining that the requested portion of the requested file cannot be transferred and transferring the entire requested file and supplying the requested data to the computer malware scanning software to fulfill the request for data comprising a portion of the requested file. The requested portion of the requested file may not be transferred because the requested portion of the requested file cannot be randomly accessed. An indication that the requested portion of the requested file cannot be randomly accessed may comprise an error indication or a transfer of the entire requested file.

In one aspect of the present invention, the method further comprises the steps of tracking information associated with each transfer of a requested portion of the file and determining that information associated with the file has changed. The information associated with the file may comprise hypertext transfer protocol entity tags or last modified timestamp information. The method may further comprise the step of restarting the requests from the computer malware scanning software for data. The method may further comprise the step of transferring the entire requested file.

In one aspect of the present invention, the method may further comprise the steps of scanning at the computer malware scanning software the data comprising a portion of the requested file to determine if the file includes a computer malware and delivering the file to the user system in response to determining that the file does not include a computer malware. The step of delivering the file to the user system may comprise the steps of determining whether the entire file has been transferred, starting delivery of the file to the user system even if the entire file has not been transferred, and transferring those portions of the file that have not been transferred and delivering those portions of the file once they have been transferred. The step of transferring those portions of the file that have not been transferred may comprise the steps of initiating a session with the external system to obtain those portions of the file that have not been transferred. The session may be a hypertext transfer protocol session. The hypertext transfer protocol session may use a byte range technique.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
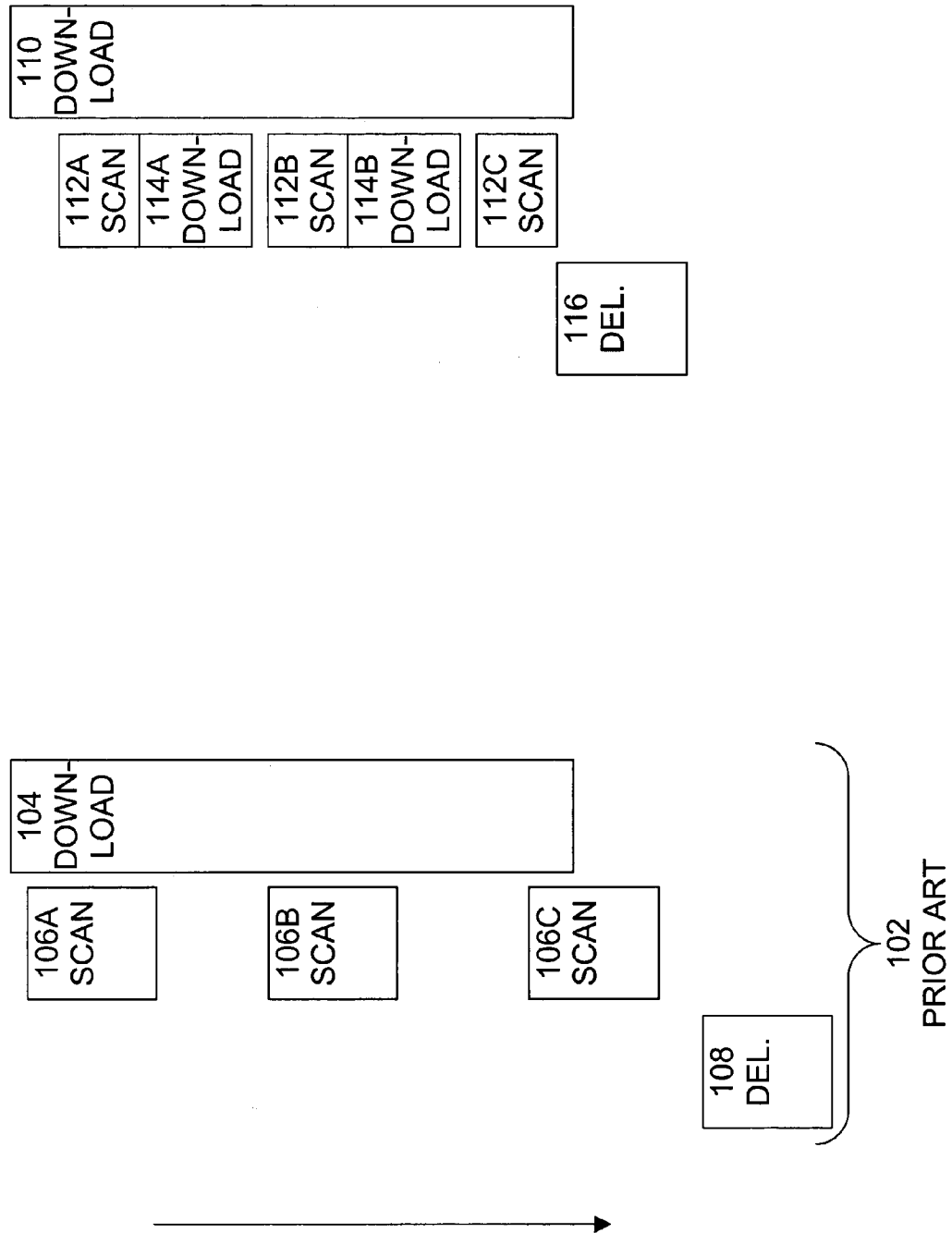
FIG. 1 is a data flow timing diagram showing both a prior art file transfer process and a file transfer process according to the present invention.

The present invention is a system, method, and computer program product for scanning downloaded files that provides improved performance relative to conventional download scanning techniques. The present invention performs the download and scanning functions in parallel, thus improving overall performance, as shown in FIG. 1. In a typical prior art process 102, there is a single download operation. A requested file is downloaded 104 into a scanning server. The scanning server then scans 106A-C the downloaded file for the presence of any computer malwares. If the scanner needs a part of the file that has not arrived, it must wait for it to arrive. So, the scanner can execute for a time 106A, then is blocked until data arrives, then becomes unblocked 106B, only to have to wait again, until finally 106C all the data has arrived and the scanner can finish. When the scan is complete, the scanning server delivers 108 the scanned file to the requesting user system.

By contrast, in the present invention, there can be several parallel download operations. Download 110 of a requested file is begun. As soon as some minimum portion of the requested file has been downloaded, the downloaded portion is scanned 112A for the presence of any computer malwares. After the scan, the scanner will indicate either that the file is clean of malware, or that the scanner needs an additional portion of the file. Additional portions of the requested file are downloaded 114A and 114B immediately, in contrast to the prior art's having to wait. As portions 114A and 114B arrive, they are scanned for malwares 112B and 112C. Typically, the entire requested file does not need to be scanned in order to determine that no malware is present in the file. Thus, as soon as the final scan 112C is completed, delivery 116 to the end user of the portion of the requested file that has already been downloaded begins, while transfers to get any unrequested portions of the file are also initiated. In some cases, since the local network connection between the end user and the scanning server is typically significantly faster than the WAN connection, delivery of the requested file to the requesting user system may begin before the entire requested file has been downloaded to the scanning server. This parallel performance of the download, scanning and delivery operations provides a significant decrease in the start-to-finish time of the overall process.

A typical computer malware is a program or piece of code that is loaded onto a computer and/or performs some undesired actions on a computer without the knowledge or consent of the computer operator. Types of malware include computer viruses, Trojan horse programs, and other content. One widespread, well-known and dangerous type of computer malware are computer viruses, that is, programs or pieces of code that replicate themselves and load themselves onto other connected computers. Once the virus has been loaded onto the computer, it is activated and may proliferate further and/or damage the computer or other computers. A particular type of computer virus is the computer worm, which is a program or code that replicates itself over a computer network and may performs malicious actions, such as using up the computer's resources and possibly shutting the system down. A Trojan horse program is typically a destructive program that masquerades as a benign application. Unlike a virus, Trojan horses do not replicate themselves but they can be just as destructive. One insidious type of Trojan horse is a program that claims to rid a computer of malwares but instead introduces malwares onto the computer. Although terms such as virus or anti-virus may be used for clarity, such terms are used only as example of malwares and the present invention contemplates any and all types of malware, including, but not limited to computer viruses, computer worms, Trojan horse programs.

Each of the individual Download operations described above is an individual HTTP query. The queries may be passed over a persistent connection to improve efficiency. Since there are multiple HTTP queries, the file on the web server may be modified as it is being downloaded. The HTTP server will indicate that event using the last-modified timestamp, and the Entity Tag attributes. The scanner will need to be able to either restart or fall back to the prior art procedure if the file is modified while it is being scanned.

Range queries are a feature of HTTP 1.1. An HTTP 1.0 server will not implement them, and an HTTP 1.1 server may refuse them. In either event, the server will reply to an attempted range query with the complete content of the page, or an error indication. The invention would detect either case, and get the entire file in a single HTTP session. This will cause it to fall back and behave exactly as the original system.

An HTTP 1.1 server is required to implement entity tags. The entity tag is guaranteed to change if the content of the file changes. So, if range queries are successfully sent the invention must keep track of the entity tags reported by each individual HTTP transfer. In the event that the entity tag changes, the invention must discard all the old blocks of data and restart the scan for malware. It may either restart in range query mode and hope the entity tag doesn't change again, or fall back to a single large HTTP transfer.

If an HTTP 1.1 server does not properly implement entity tags, there is a last modified timestamp, which is also sent. It may be used as an alternative to entity tags, or a validation.

Figure 2:
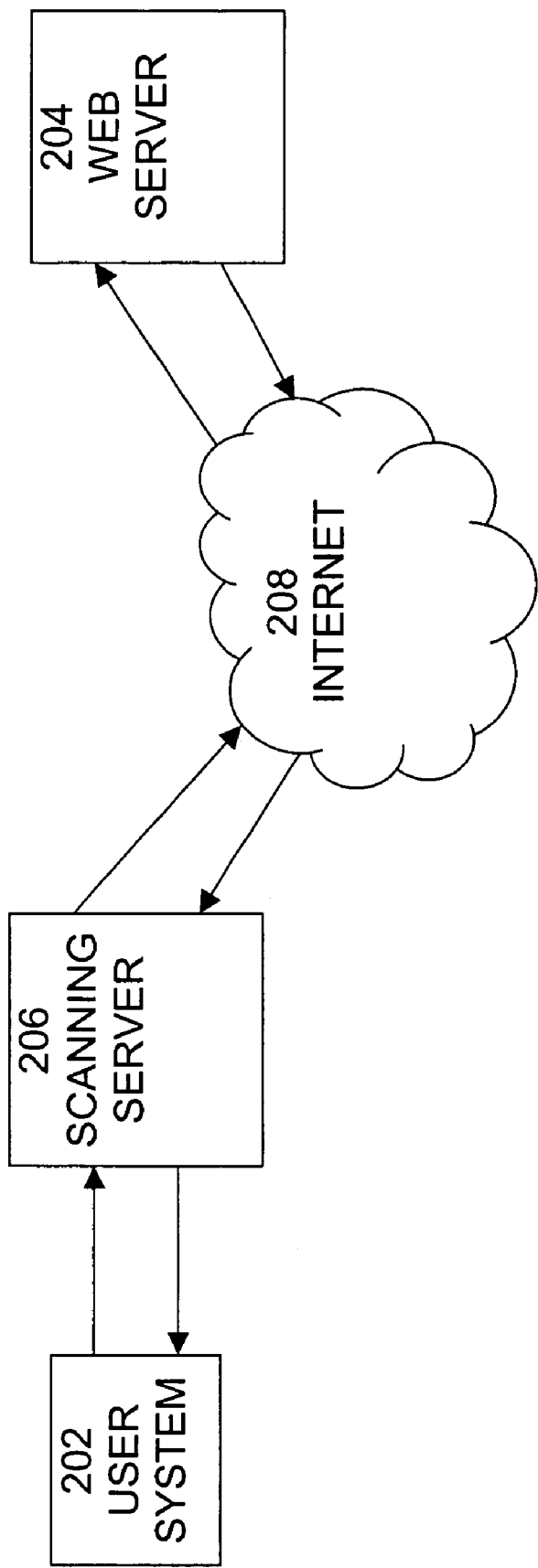
FIG. 2 is an exemplary system in which the present invention may be implemented.

An exemplary system in which the present invention may be implemented is shown in FIG. 2. A user system 202 is communicatively connected to a Web server 204 via a scanning server 206 and the Internet 208. Typically, a user operating user system 202, will browse to a Website and select a link that requests the transfer of a file from Web server 204 to user system 202. If scanning server 206 were not present, the request would be transmitted to Web server 204 and the file would be transferred to user system 202 via the Internet 208. With scanning server 206 present, the request is intercepted by the scanning server and routed to computer malware scanning software that will scan the file. The scanning software typically does not read most files completely from front to back, instead, it "skips around" in the file, reading first at the beginning of the file, then reading selected, and relatively small, portions of the file.

Additional software is provided in scanning server 206 that provides the capability for the download and scanning functions to be performed in parallel, without modification to the scanning software. This additional software emulates system level function calls, such as open( ), read( ) and seek( ), that are used by the scanning software to scan a file for a virus, so the scanner can execute in this environment with minimal or no modifications. When a file transfer is initiated, scanning server 206 will attempt to download and cache the entire file, after which the scanning software will scan the cached file for malwares. However, in the present invention, instead of caching the entire file, the additional software will indicate to the scanning software that the entire file has been cached. As part of the scanning software operation, when a read is made for part of the file that has not yet been transferred, a new http session will be initiated to request the bytes in the read( ), at the current offset within the filepointer implicitly maintained by the engine. This is done by leveraging the "byte range" techniques that are defined in the HTTP specifications, which, in effect, allows us to turn a serial download mechanism into a random access file system.

Once the scan completes with no malware found, the remaining portions of the file that have not yet been transferred may be transferred using the highest speed transfer mechanism available, since those portions of the file do not themselves need to be scanned.

Figure 3:
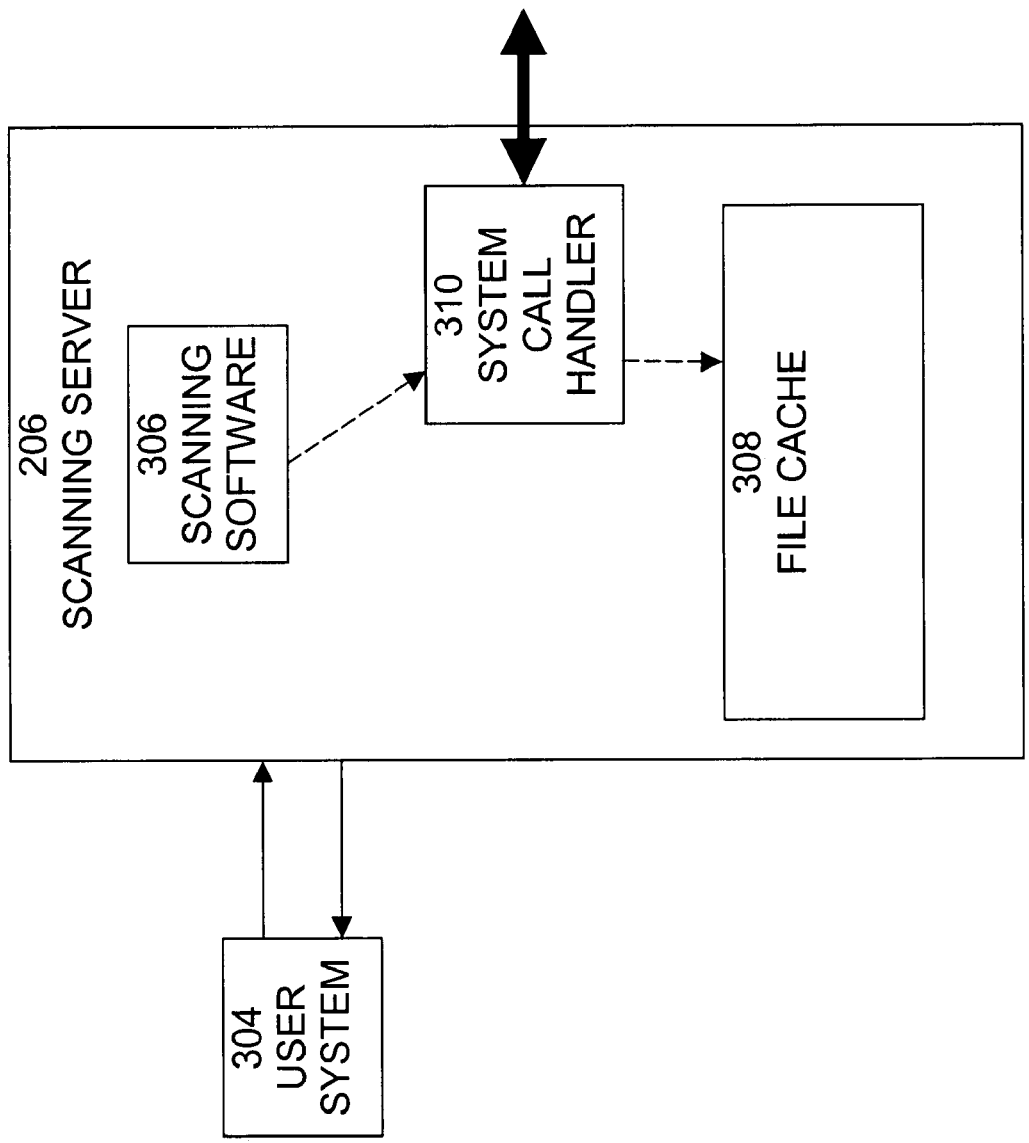
FIG. 3 is a data flow diagram of parallel reading, scanning, and delivery of files by a scanning server shown in FIG. 2.
Figure 4:
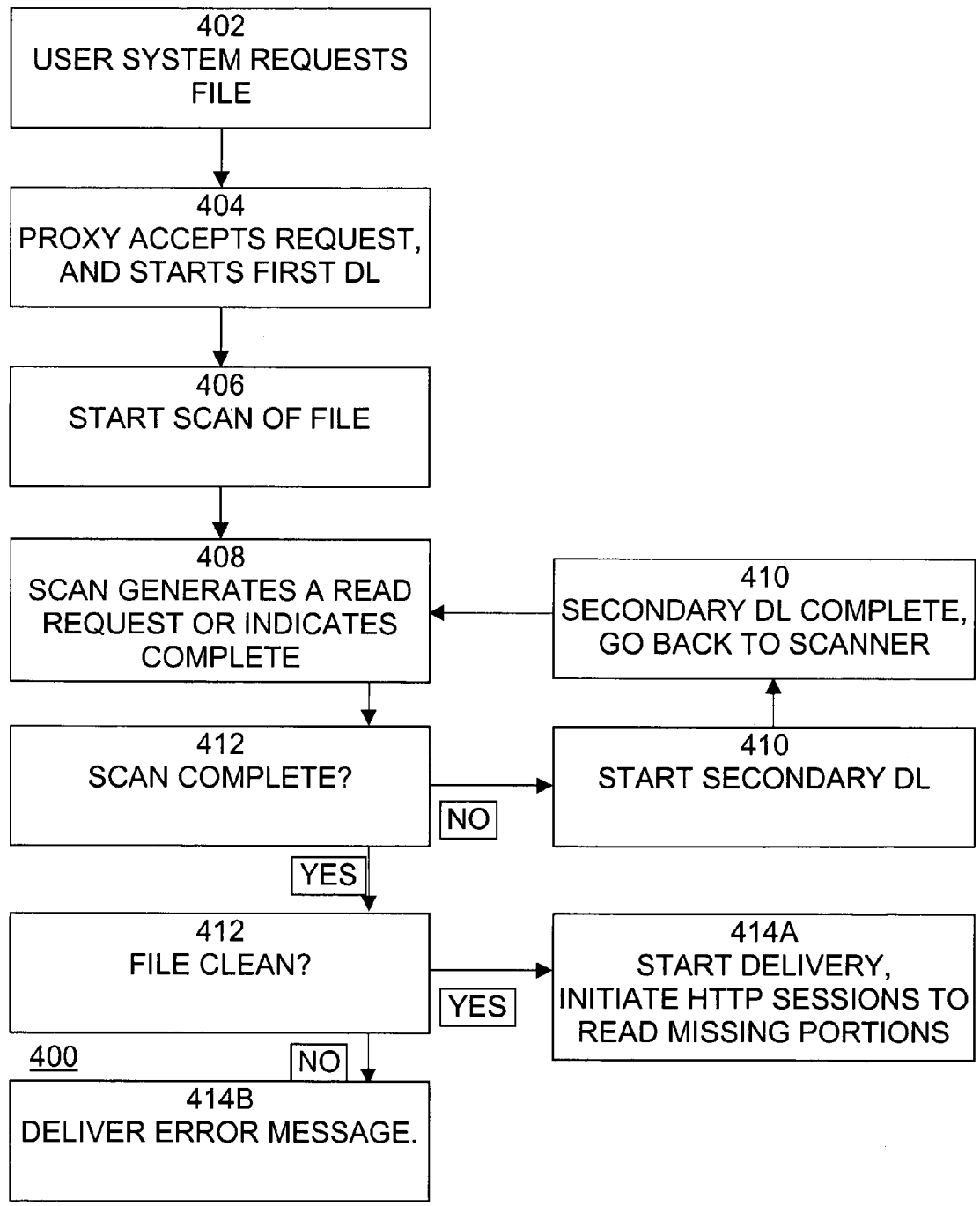
FIG. 4 is a flow diagram of a process of parallel reading, scanning, and delivery of files, according to the present invention.

A process 400 of parallel reading, scanning, and delivery of files is shown in FIG. 4. It is best viewed in conjunction with FIG. 3, which is a data flow diagram of parallel reading, scanning, and delivery of files by scanning server 206, shown in FIG. 2. Process 400 starts with step 402, in which a user system 304 requests a file. Typically, the user operating user system 304 will browse to a Website and select a link that requests the transfer of a file from a Web server to user system 304. If scanning server 206 were not present, the request would be transmitted to the Web server and the file transfer to user system 304 would begin. With scanning server 206 present, the request is intercepted by the scanning server and routed to computer malware scanning software 306 that will scan the file.

The Scanning server 206 then starts to download the file and when some minimum of the file has arrived, passes it to the scanner. The scanner then inspects the file and indicates that it is either finished (and the file is clean or dirty) or it needs additional data. If the scanner is not finished, the scanning server loops, requesting additional parts of the file and passing them to the scanner. Eventually, the scanner will indicate it is done, and the scanning server will either deliver the file to the user system, or deliver an error message.

At the time the scan is complete, the file may not be completely downloaded to the scanning server. So, it will deliver what it has, while at the same time finishing downloading it from the web server 204.

Scanning software 306 will perform system level calls to request the transfer of the file to the scanning server, and in particular to file cache 308. In conventional systems, the entire file will be transferred to the file cache, then the scanning software will randomly read selection portions of the cached file in order to scan for malwares. In the present invention, this process is simulated for scanning software 306, so that scanning software 306 need not be modified in order to implement the present invention. Instead, in step 404, system level calls made by scanning software 306 are intercepted by system call handler 310. System call handler 310 intercepts and simulates system level function calls, such as open( ), close( ), read( ), and seek( ) (or operating system specific equivalents), which scanning software 306 uses to examine a file for a malware.

When scanning software 306 first requests transfer of a file, in step 406, system call handler 310 indicates that the entire requested file has been transferred to file cache 308, which, in step 408, allows scanning software 306 perform its scan without modification as though the entire file were stored in file cache 308. The performance of the scan involves scanning software 306 reading selected portions of the file in a random order. However, system call handler 310 does not, in fact, transfer the entire file-to-file cache 308. Instead, as scanning software 306 issues system calls to read selected portions of the file in order to scan the file, system call handler 310 intercepts those calls and supplies the requested portions of the file. For portions of the file that have not yet been transferred, system call handler 310 supplies the requested portion of the file in step 410 by initiating a new http session to request the bytes in the read call, at the current offset within the filepointer implicitly maintained by scanning software 306. Upon completion of the transfer of the requested portion of the file, the read call is supplied with the transferred data. For portions of the file that have already been transferred, the read call can be supplied by data in file cache 308.

In step 412, the scan performed by scanning software 306 is completed. If the scan indicates that there are no malwares present in the file, delivery of the file to user system 304 is started. Typically, at the end of the scanning process, portions of the file have not yet been transferred. In this case, in step 414, one or more HTTP sessions are initiated to obtain the missing portions of the file.

Because the scan has completed with no malware found, the remaining portions of the file that have not yet been transferred may be transferred using the highest speed transfer mechanism available, since those portions of the file do not themselves need to be scanned.

The HTTP specification defines a number of mechanisms for transferring portions of requested files or entities. For example, HTTP retrieval requests using conditional or unconditional GET methods may request one or more subranges of the entity, instead of the entire entity, using the Range request header, which applies to the entity returned as the result of the request:

Range="Range" ":" ranges-specifier

If the server supports the Range header and the specified range or ranges are appropriate for the entity:

The presence of a Range header in an unconditional GET modifies what is returned if the GET is otherwise successful. In other words, the response carries a status code of 206 (Partial Content) instead of 200 (OK).

The presence of a Range header in a conditional GET (a request using one or both of If-Modified-Since and If-None-Match, or one or both of If-Unmodified-Since and If-Match) modifies what is returned if the GET is otherwise successful and the condition is true. It does not affect the 304 (Not Modified) response returned if the conditional is false.

If a proxy that supports ranges receives a Range request, forwards the request to an inbound server, and receives an entire entity in reply, it SHOULD only return the requested range to its client. It SHOULD store the entire received response in its cache, if that is consistent with its cache allocation policies.

Since some portions of the file may be transferred at a significantly later time than the initial portions of the file, and since the file is not locked by the Web server in between the HTTP sessions, it is possible that the file on the Web server may be modified between HTTP sessions that transfer the same file. In this case, the various portions of the file that are transferred may not be consistent with one another. This situation can be detected by use of the entity tags included in the responses received during each HTTP session.

Entity tags are used for comparing two or more entities from the same requested resource. An entity tag consists of an opaque quoted string, possibly prefixed by a weakness indicator.

entity-tag=[weak] opaque-tag
   weak="W/"
   opaque-tag=quoted-string

A "strong entity tag" may be shared by two entities of a resource only if they are equivalent by octet equality. A "weak entity tag," indicated by the "W/" prefix, may be shared by two entities of a resource only if the entities are equivalent and could be substituted for each other with no significant change in semantics. A weak entity tag can only be used for weak comparison.

An entity tag MUST be unique across all versions of all entities associated with a particular resource. A given entity tag value may be used for entities obtained by requests on different URIs without implying anything about the equivalence of those entities.

If one or more portions of the requested file have been transferred, and the remaining portions of the file are to be obtained, this may be done by using the Range request-header with a conditional GET (using either or both of If-Unmodified-Since and If-Match.) However, if the condition fails because the entity has been modified, then it is necessary to make a second request to obtain the entire current version of the file.

The If-Range header provides an alternative that allows the second request to be avoided. Informally, its meaning is 'if the entity is unchanged, send me the part(s) that I am missing; otherwise, send me the entire new entity.'

If-Range="If-Range" ":" (entity-tag|HTTP-date)

Figure 5:
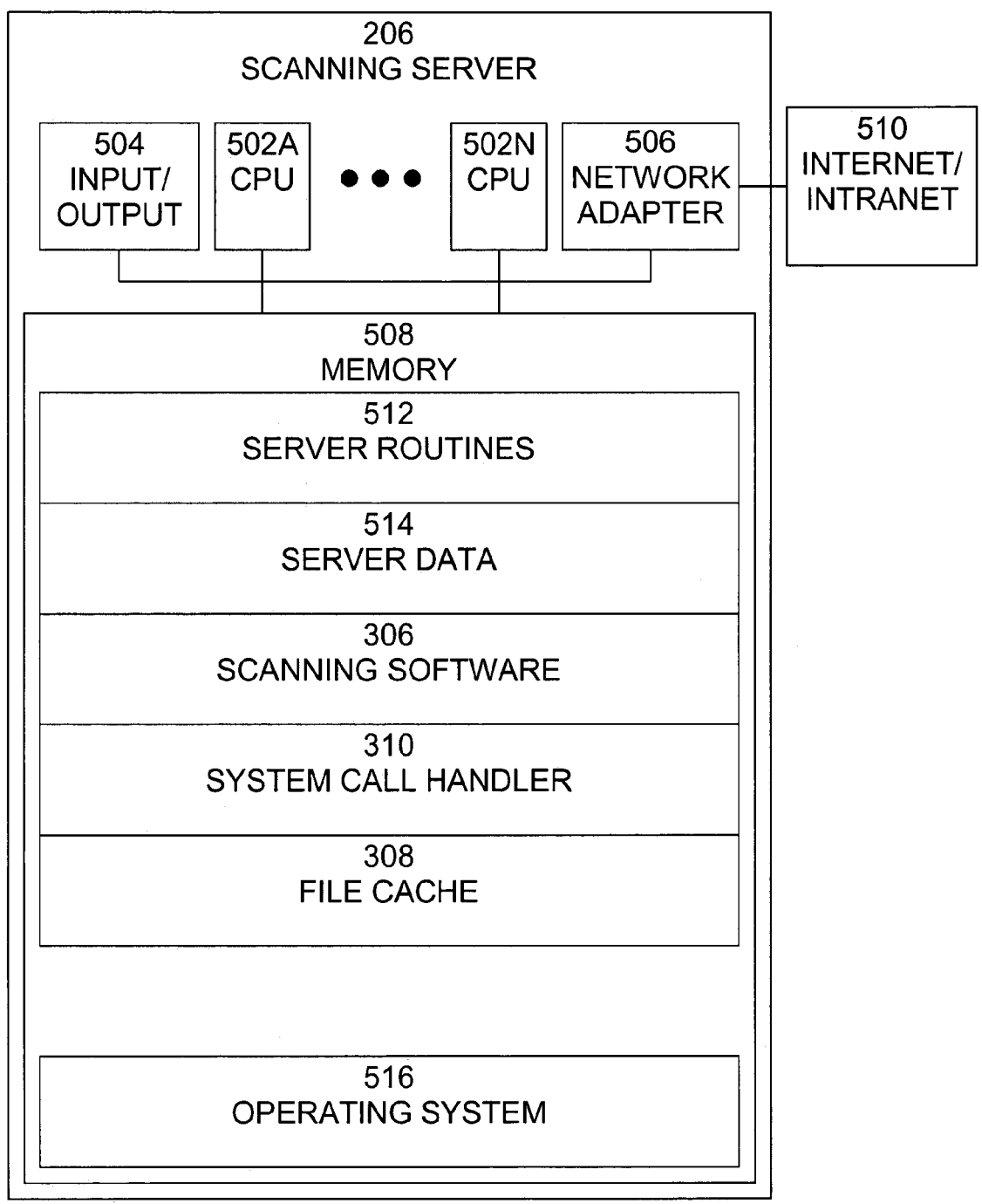
FIG. 5 is an exemplary block diagram of a scanning server shown in FIG. 2

An exemplary block diagram of a scanning server 206, shown in FIG. 2, is shown in FIG. 5. Server 206 is typically a programmed general-purpose computer system, such as a personal computer, workstation, server system, and minicomputer or mainframe computer. Server 206 includes one or more processors (CPUs) 502A-502N, input/output circuitry 504, network adapter 506, and memory 508. CPUs 502A-502N execute program instructions in order to carry out the functions of the present invention. Typically, CPUs 502A-502N are one or more microprocessors, such as an INTEL PENTIUM® processor. FIG. 5 illustrates an embodiment in which server 206 is implemented as a single multi-processor computer system, in which multiple processors 502A-502N share system resources, such as memory 508, input/output circuitry 504, and network adapter 506. However, the present invention also contemplates embodiments in which server 206 is implemented as a plurality of networked computer systems, which may be single-processor computer systems, multi-processor computer systems, or a mix thereof.

Input/output circuitry 504 provides the capability to input data to, or output data from, server 206. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces server 206 with Internet/intranet 510. Internet/intranet 510 may include one or more standard local area network (LAN) or wide area network (WAN), such as Ethernet, Token Ring, the Internet, or a private or proprietary LAN/WAN.

Memory 508 stores program instructions that are executed by, and data that are used and processed by, CPUs 502A-502N to perform the functions of server 206. Memory 508 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 5, memory 508 includes server routines 512, server data 514, scanning software 306, system call handler 310, file cache 308, and operating system 516. The system call handler should go between the cache and the scanning software (the scanning software does not directly access the cache). Scanning software 306 performs the scanning of the information being transferred, to verify that no malwares are present. File cache 310 provides storage for information being transferred while the information is being scanned by scanning software 310. Scanning software 306 will perform system level calls to request the transfer of the file to scanning server 206, and in particular to file cache 308. In conventional systems, the entire file will be transferred to the file cache, then the scanning software will randomly read selection portions of the cached file in order to scan for malwares. In the present invention, this process is simulated for scanning software 306, so that scanning software 306 need not be modified in order to implement the present invention. Instead, in step 404, system level calls made by scanning software 306 are intercepted by system call handler 310. System call handler 310 intercepts and simulates system level function calls, such as open( ), close( ), read( ), and seek( ) (or operating system specific equivalents), which scanning software 306 uses to examine a file for a malware. Operating system 528 provides overall system functionality.

Alternatively, the scanning software library may export additional API's to allow the application to more easily provide the system-specific functionality.

As shown in FIG. 5, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of transferring a requested file for a computer malware scanning software comprising the steps of:
   receiving a request to transfer a file from a computer malware scanning software;
   receiving a request from the computer malware scanning software for data comprising a randomly accessed portion of the requested file selected in a random order by the computer malware scanning software from among portions of the requested file and based on a portion of the requested file to be scanned by the computer malware scanning software, wherein the randomly accessed portion of the requested file is requested utilizing a byte range technique;
   in response to a determination that the requested portion of the requested file cannot be transferred, transferring an entirety of the requested file and supplying the requested data to the computer malware scanning software to fulfill the request for data comprising a portion of the requested file, wherein it is determined that the requested portion of the requested file cannot be transferred if the requested portion of the requested file cannot be randomly accessed;
   in response to a determination that the requested portion of the requested file can be transferred, transferring the requested portion of the requested file and supplying the requested data to the computer malware scanning software to fulfill the request for data comprising a portion of the requested file;
   tracking information associated with each transfer of a requested portion of the requested file; and
   determining whether information associated with the requested file has changed;
   wherein the byte range technique turns a serial download mechanism into a random access file mechanism;
   wherein the data associated with the request from the computer malware scanning software comprises a plurality of randomly accessed portions of the requested file.

2. The method of claim 1, wherein the request to transfer the requested file from the computer malware scanning software comprises a request to transfer the requested file from an external system.

3. The method of claim 2, wherein the external system is communicatively connected via a network.

4. The method of claim 3, wherein the network comprises the Internet.

5. The method of claim 4, wherein the step of transferring the requested portion of the requested file comprises the step of:
   initiating a session with the external system to obtain the requested portion of the requested file.

6. The method of claim 5, wherein the session is a hypertext transfer protocol session.

7. The method of claim 6, wherein the hypertext transfer protocol session uses the byte range technique.

8. The method of claim 1, wherein an indication that the requested portion of the requested file cannot be randomly accessed comprises an error indication or a transfer of the entire requested file.

9. The method of claim 1, wherein the information comprises hypertext transfer protocol entity tags or last modified timestamp information.

10. The method of claim 9, further comprising the step of:
    restarting the requests from the computer malware scanning software for data.

11. The method of claim 10, further comprising the step of:
    transferring the entirety of the requested file.

12. The method of claim 1, further comprising the step of:
    performing the steps of claim 1 in response to a request from a user system for the requested file.

13. The method of claim 12, further comprising the steps of:
    scanning at the computer malware scanning software the data comprising a portion of the requested file to determine if the requested file includes a computer malware; and
    delivering the requested file to the user system in response to determining that the requested file does not include a computer malware.

14. The method of claim 13, wherein the step of delivering the requested file to the user system comprises the steps of:
    determining whether the entirety of the requested file has been transferred;
    starting delivery of the requested file to the user system even if the entire file has not been transferred; and
    transferring those portions of the requested file that have not been transferred and delivering those portions of the requested file once they have been transferred.

15. The method of claim 14, wherein the step of transferring those portions of the requested file that have not been transferred comprises the step of:
    initiating a session with the external system to obtain those portions of the requested file that have not been transferred.

16. The method of claim 15, wherein the session is a hypertext transfer protocol session.

17. The method of claim 16, wherein the hypertext transfer protocol session uses the byte range technique.

18. The method of claim 1, wherein the plurality of randomly accessed portions of the requested file are read in a random order.

19. The method of claim 1, wherein a system call handler intercepts system level calls made by the computer malware scanning software and simulates system level function calls utilized by the computer malware scanning software to determine whether the requested file includes the computer malware.

20. The method of claim 1, wherein scanning by the computer malware scanning software is performed in parallel with transfers of requested portions of the requested file to the malware scanning software.

21. A system comprising:
a processor operable to execute computer program instructions;
a memory operable to store computer program instructions executable by the processor; and
computer program instructions stored in the memory and executable to perform the steps of:
receiving a request to transfer a file from a computer malware scanning software;
receiving a request from the computer malware scanning software for data comprising a randomly accessed portion of the requested file selected in a random order by the computer malware scanning software from among portions of the requested file and based on a portion of the requested file to be scanned by the computer malware scanning software, wherein the system is operable such that the randomly accessed portion of the requested file is requested utilizing a byte range technique;
in response to a determination that the requested portion of the requested file cannot be transferred, transferring an entirety of the requested file and supplying the requested data to the computer malware scanning software to fulfill the request for data comprising a portion of the requested file, wherein the system is operable such that it is determined that the requested portion of the requested file cannot be transferred if the requested portion of the requested file cannot be randomly accessed;
in response to a determination that the requested portion of the requested file can be transferred, transferring the requested portion of the requested file and supplying the requested data to the computer malware scanning software to fulfill the request for data comprising a portion of the requested file;
tracking information associated with each transfer of a requested portion of the requested file; and
determining whether information associated with the requested file has changed;
wherein the system is operable such that the byte range technique turns a serial download mechanism into a random access file mechanism;
wherein the system is operable such that the data associated with the request from the computer malware scanning software comprises a plurality of randomly accessed portions of the requested file.

22. The system of claim 21, wherein the request to transfer the requested file from the computer malware scanning software comprises a request to transfer the requested file from an external system.

23. The system of claim 22, wherein the external system is communicatively connected via a network.

24. The system of claim 23, wherein the network comprises the Internet.

25. The system of claim 24, wherein the step of transferring the requested portion of the requested file comprises the step of:
initiating a session with the external system to obtain the requested portion of the requested file.

26. The system of claim 25, wherein the session is a hypertext transfer protocol session.

27. The system of claim 26, wherein the hypertext transfer protocol session uses the byte range technique.

28. The system of claim 21, wherein an indication that the requested portion of the requested file cannot be randomly accessed comprises an error indication or a transfer of the entire requested file.

29. The system of claim 21, wherein the information comprises hypertext transfer protocol entity tags or last modified timestamp information.

30. The system of claim 29, further comprising the step of:
restarting the requests from the computer malware scanning software for data.

31. The system of claim 30, further comprising the step of:
transferring the entirety of the requested file.

32. The system of claim 21, further comprising the step of:
performing the steps of claim 1 in response to a request from a user system for the requested file.

33. The system of claim 32, further comprising the steps of:
scanning at the computer malware scanning software the data comprising a portion of the requested file to determine if the requested file includes a computer malware; and
delivering the requested file to the user system in response to determining that the requested file does not include a computer malware.

34. The system of claim 33, wherein the step of delivering the requested file to the user system comprises the steps of:
determining whether the entirety of the requested file has been transferred;
starting delivery of the requested file to the user system even if the entire requested file has not been transferred; and
transferring those portions of the requested file that have not been transferred and delivering those portions of the requested file once they have been transferred.

35. The system of claim 34, wherein the step of transferring those portions of the requested file that have not been transferred comprises the step of:
initiating a session with the external system to obtain those portions of the requested file that have not been transferred.

36. The system of claim 35, wherein the session is a hypertext transfer protocol session.

37. The system of claim 36, wherein the hypertext transfer protocol session uses the byte range technique.

38. A computer program product comprising:
a tangible computer readable storage medium;
computer program instructions, recorded on the computer readable storage medium, executable by a processor, for performing the steps of:
receiving a request to transfer a file from a computer malware scanning software;
receiving a request from the computer malware scanning software for data comprising a randomly accessed portion of the requested file selected in a random order by the computer malware scanning software from among portions of the requested file and based on a portion of the requested file to be scanned by the computer malware scanning software, wherein the computer program product is operable such that the randomly accessed portion of the requested file is requested utilizing a byte range technique;
in response to a determination that the requested portion of the requested file cannot be transferred, transferring an entirety of the requested file and supplying the requested data to the computer malware scanning software to fulfill the request for data comprising a portion of the requested file, wherein the computer program product is operable such that it is determined that the requested portion of the requested file cannot be transferred if the requested portion of the requested file cannot be randomly accessed, in response to a determination that the requested portion of the requested file can be transferred, transferring the requested portion of the requested file and supplying the requested data to the computer malware scanning software to fulfill the request for data comprising a portion of the requested file;

tracking information associated with each transfer of a requested portion of the requested file; and determining whether information associated with the requested file has changed;

wherein the computer program product is operable such that the byte range technique turns a serial download mechanism into a random access file mechanism;

wherein the computer program product is operable such that the data associated with the request from the computer malware scanning software comprises a plurality of randomly accessed portions of the requested file.

39. The computer program product of claim 38, wherein the request to transfer the requested file from the computer malware scanning software comprises a request to transfer the requested file from an external system.

40. The computer program product of claim 39, wherein the external system is communicatively connected via a network.

41. The computer program product of claim 40, wherein the network comprises the Internet.

42. The computer program product of claim 41, wherein the step of transferring the requested portion of the requested file comprises the step of:

initiating a session with the external system to obtain the requested portion of the requested file.

43. The computer program product of claim 42, wherein the session is a hypertext transfer protocol session.

44. The computer program product of claim 43, wherein the hypertext transfer protocol session uses the byte range technique.

45. The computer program product of claim 38, wherein an indication that the requested portion of the requested file cannot be randomly accessed comprises an error indication or a transfer of the entire requested file.

46. The computer program product of claim 38, wherein the information comprises hypertext transfer protocol entity tags or last modified timestamp information.

47. The computer program product of claim 46, further comprising the step of:

restarting the requests from the computer malware scanning software for data.

48. The computer program product of claim 47, further comprising the step of:

transferring the entirety of the requested file.

49. The computer program product of claim 38, further comprising the step of:

performing the steps of claim 1 in response to a request from a user system for the requested file.

50. The computer program product of claim 49, further comprising the steps of:

scanning at the computer malware scanning software the data comprising a portion of the requested file to determine if the requested file includes a computer malware; and delivering the requested file to the user system in response to determining that the requested file does not include a computer malware.

51. The computer program product of claim 50, wherein the step of delivering the requested file to the user system comprises the steps of:

determining whether the entirety of the requested file has been transferred;

starting delivery of the requested file to the user system even if the entire requested file has not been transferred; and transferring those portions of the requested file that have not been transferred and delivering those portions of the requested file once they have been transferred.

52. The computer program product of claim 51, wherein the step of transferring those portions of the requested file that have not been transferred comprises the step of:

initiating a session with the external system to obtain those portions of the requested file that have not been transferred.

53. The computer program product of claim 52, wherein the session is a hypertext transfer protocol session.

54. The computer program product of claim 53, wherein the hypertext transfer protocol session uses the byte range technique.

\* \* \* \* \*

UNITED STATES PATENT AND TRADEMARK OFFICE
CERTIFICATE OF CORRECTION

PATENT NO. : 7,640,586 B1  Page 1 of 1
APPLICATION NO. : 10/612996
DATED : December 29, 2009
INVENTOR(S) : Johnson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1123 days.

Signed and Sealed this

Twenty-first Day of December, 2010

David J. Kappos
*Director of the United States Patent and Trademark Office*